(12) United States Patent
Viklund

(10) Patent No.: US 11,635,503 B2
(45) Date of Patent: Apr. 25, 2023

(54) SONAR WITH DAMPING STRUCTURE

(71) Applicant: SAAB AB, Linkoeping (SE)

(72) Inventor: Oskar Viklund, Linkoeping (SE)

(73) Assignee: SAAB AB, Linkoeping (SE)

( * ) Notice: Subject to any disclaimer, the term of this patent is extended or adjusted under 35 U.S.C. 154(b) by 632 days.

(21) Appl. No.: 16/464,774

(22) PCT Filed: Nov. 30, 2016

(86) PCT No.: PCT/SE2016/051188
§ 371 (c)(1),
(2) Date: May 29, 2019

(87) PCT Pub. No.: WO2018/101865
PCT Pub. Date: Jun. 7, 2018

(65) Prior Publication Data
US 2019/0317200 A1  Oct. 17, 2019

(51) Int. Cl.
*G01S 7/521* (2006.01)
*G01S 15/04* (2006.01)
*H04R 31/00* (2006.01)

(52) U.S. Cl.
CPC .............. *G01S 7/521* (2013.01); *G01S 15/04* (2013.01); *H04R 31/00* (2013.01)

(58) Field of Classification Search
CPC .... B60S 1/023; B60S 1/62; B60S 1/56; B60S 1/485; G08B 21/24; G08B 21/02; G08B 7/06; B60R 25/305; B60R 25/104; B60R 25/01; B60R 25/24; B60R 1/12;
(Continued)

(56) References Cited

U.S. PATENT DOCUMENTS 9,074,963 B2 *  7/2015  Rose ................. G01H 11/08
9,339,846 B2 *  5/2016  Sun .................. G01S 15/931
(Continued)

FOREIGN PATENT DOCUMENTS

DE   102009022187 A1   11/2010
DE   102010018993 A1   11/2011
(Continued)

OTHER PUBLICATIONS

International Searching Authority, International Search Report and Written Opinion for International Application No. PCT/SE2016/051188, dated Aug. 31, 2017, 11 pages, Sweden.
(Continued)

*Primary Examiner* — Daniel L Murphy
*Assistant Examiner* — Amie M Ndure
(74) *Attorney, Agent, or Firm* — Alston & Bird LLP

(57) ABSTRACT

The present disclosure relates to a sonar device (1) for detection of underwater objects. The sonar device comprises a body element (2) having a cavity. A piezo electric element (3) is comprised within the cavity. A resin filling (6) of the cavity protects the piezo electric element (3) from water at underwater operation. The sonar device further comprises a holder (4) adapted to hold the piezo electric element (3). The holder (4) is arranged to centre and hold the piezo electric element (3) within said body element (2). The holder (4) comprises in its structure a plurality of damping structures (5). A method of manufacturing holder and a sonar device is also disclosed.

14 Claims, 5 Drawing Sheets

(58) Field of Classification Search
CPC .... B60R 2001/1253; B60R 2001/1215; B60R 2025/1013
See application file for complete search history.

(56) References Cited

U.S. PATENT DOCUMENTS

| | | | |
|---|---|---|---|
| 2007/0132567 A1* | 6/2007 | Schofield | B60R 11/0247 340/438 |
| 2007/0171037 A1* | 7/2007 | Schofield | B60R 1/00 340/438 |
| 2008/0144441 A1 | 6/2008 | Colangelo | |
| 2008/0168841 A1* | 7/2008 | Matsuo | G10K 9/122 73/649 |
| 2008/0212215 A1* | 9/2008 | Schofield | B60R 11/04 359/844 |
| 2011/0120209 A1* | 5/2011 | Rose | G01H 11/08 73/40.5 A |
| 2012/0112604 A1 | 5/2012 | Hasegawa | |
| 2013/0272098 A1* | 10/2013 | Cahalan | B63C 11/26 367/134 |
| 2013/0289593 A1 | 10/2013 | Hall et al. | |
| 2015/0158052 A1* | 6/2015 | Latev | B32B 37/12 310/316.01 |
| 2016/0041259 A1* | 2/2016 | Chowdhury | G01S 7/52 367/140 |

FOREIGN PATENT DOCUMENTS

| | | | |
|---|---|---|---|
| DE | 102012104227 A1 | | 11/2013 |
| DE | 102012210513 A1 * | 12/2013 | ........... G10K 11/165 |
| DE | 102012210513 A1 | | 12/2013 |
| EP | 1924121 A1 | | 5/2008 |
| EP | 1993322 A1 | | 11/2008 |
| GB | 1336847 A | | 11/1973 |

OTHER PUBLICATIONS

International Preliminary Examining Authority, International Preliminary Report On Patentability for International Application No. PCT/SE2016/051188, dated Oct. 16, 2018, 10 pages, Sweden.

European Patent Office, Extended European Search Report received for Application No. 16923037.2, dated Jul. 7, 2020, 11 pages, Germany.

Lord Corporation, "CoolTherm™ SC-309 Thermally Conductive Silicone Encapsulant", Lord Technical Data, 2017, 2 pages, Retrieved from http://files.lord.com/pdf/44/DS3686 CoolThermSC-309.pdf on Jun. 26, 2020.

Wu, Xiaodong, et al., "Robotics Echolocation Test Platform", 2015 IEEE International Conference on Electro/Information Technology (EIT), IEEE, May 21, 2015, pp. 558-562, Illinois, US.

* cited by examiner

SONAR WITH DAMPING STRUCTURE

CROSS REFERENCE TO RELATED APPLICATIONS

This application is a National Stage Application, filed under 35 U.S.C. § 371, of International Application No. PCT/SE2016/051188, filed Nov. 30, 2016; the contents of which are hereby incorporated by reference in their entirety.

BACKGROUND

Related Field

The present disclosure relates to a sonar device according to the preamble of claim 1.

The present disclosure further relates to a method of manufacturing a holder according to claim 11.

The present disclosure further relates to a method of manufacturing a sonar device according to claim 12.

Description of Related Art

A Sonar is an active or passive devices used for detecting objects under water. The acoustic frequencies used in sonar systems vary from very low infrasonic to extremely high ultrasonic.

An example of a general ultrasonic probe is disclosed in document US2012/0112604 A1. The probe is made from a copper signal foil bonded to a piezoelectric plate. For sound absorption the probe can be provided with felt. The ultrasonic probe is not adapted for underwater operation.

Another document EP1993322 A1 discloses an ultrasonic sensor having a sound absorber made from sponge. This ultra-sonic sensor is not adapted for underwater operation.

BRIEF SUMMARY

In order to achieve a well operable sonar device for detection of underwater objects, in particular for under water operation, a damper is often needed. In the prior art discussed above it is disclosed to have a damper made from sponge, or felt material. The present invention relates to a sonar device for detection of underwater objects. The sonar device comprises a body element having a cavity, the sonar device also comprises a piezo electric element comprised within the cavity of the holder. A resin filling of the cavity of the body element in order to protect the piezo electric element from water at underwater operation is also provided. Further the sonar device comprises a holder adapted to hold the for the piezo electric element and the holder is arranged to centre and hold the piezo electric element within said body element. The said holder comprises in its structure a plurality of damping structures.

The advantage of the disclosed subject matter is that the holder of the piezo electric element in its structure can achieve an effective damping. Thus a combination of a holder and a damping is achieved effectively.

According to a further development of the sonar device above there is suggested a piezo electric element that has a half spherical shape.

The advantage of this is that a half spherical shape is easy to manufacture, and can be directed in a listening direction corresponding the flat side of the half spherical shape.

According to a further development of the sonar device above the damping structures are cavities within the material of the holder.

The advantage of this is that no combination of materials is needed. No complex bonding processes is needed as the material itself comprises cavities.

According to a further development of the sonar device above the cavities comprises spherical cavities.

According to a further development of the sonar device above the spherical radius of the cavities is comprised in a range of 1/10-1/100 of the spherical radius of the piezo electric element.

According to a further development of the sonar device above each cavity has a volume that is comprised in the range of 1/1000-1/1000 000 of the volume of the piezo electric element.

The advantage of using these dimensions to is that the damping effect is improved compared with for example one large cavity or many extremely small cavities. And further, the cavities can be adapted in size depending on the operation frequency range of the sonar device.

According to a further development of the sonar device the cavities are positioned in a regular pattern in the structure of the holder such that the cavities can provide equal damping from all relevant damping directions. If a half spherical shape is applied, no damping is desired in the listening direction of the flat surface of the half sphere.

The effect of this subject matter is that the damping is performed uniformly around the piezo electric element, in the directions that are not corresponding to the listening direction.

According to a further development the sonar device the holder comprises a further cavity suitable to accommodate electronics for the sonar device directly within the structure of the holder.

The advantage of this is that the electronics is completely protected from all sides by the holder structure.

According to a further development of the sonar device, the holder is made by a reciprocating three dimensional printing device.

The advantage of this is an extremely easy and flexible manufacture that can be adapted to each piezo electric element, and body element.

According to a further development of the sonar device the holder is made of a resin material, for example urethane, nylon or other resin.

The invention also relates to a method for manufacturing a holder for a sonar device as defined above. The method comprises the steps of:

s1. providing a reciprocating three dimensional printing device s2 providing an input to said reciprocating three dimensional printing device that gives instruction to print a holder, for a piezo electric element, wherein the input to the printer comprises instruction to print at least one cavity in the holder for damping purposes.

The advantage of the above method is that holder is more easily manufactured. The adaptation of the holder is very simple. Further the method allows for cavities to be produced within the holder structure for the damping of the sonar device. This provides for a much less complex sonar device that need not be made from several different materials.

The invention also relates to a method of manufacturing a sonar device according to the above. The method for manufacturing a sonar device comprises:

s3. obtaining a holder according to the method for manufacturing a holder as defined above, s4. positioning a piezo electric element in said holder, s5. providing a body element into which said holder comprising the piezo electric element is inserted, s6. providing a resin and filling the body element with said resin and covering at the same time said holder and piezo electric element at the same time.

The method provides for an accurate and well-functioning Sonar device where the piezo electronic element is well protected and kept in place.

DETAILED DESCRIPTION OF VARIOUS EMBODIMENTS

The present disclosure relates to sonar devices 1 for detection of underwater objects according to FIGS. 1-4.

The sonar device 1 for detection of underwater objects, comprises a body element 2. The body element 2 is the element that forms the outer perimeter of the sonar device 1

The body element may have any shape.

Figure 2:
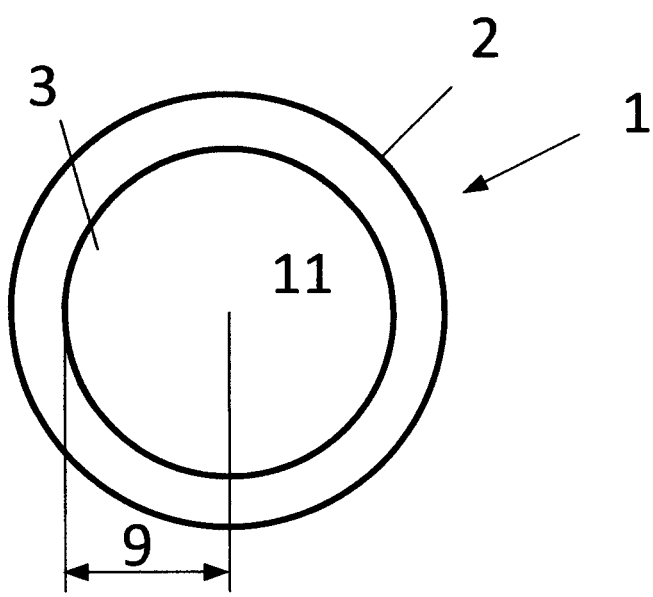
FIG. 2 discloses the sonar device of FIG. 1 from above.
Figure 3:
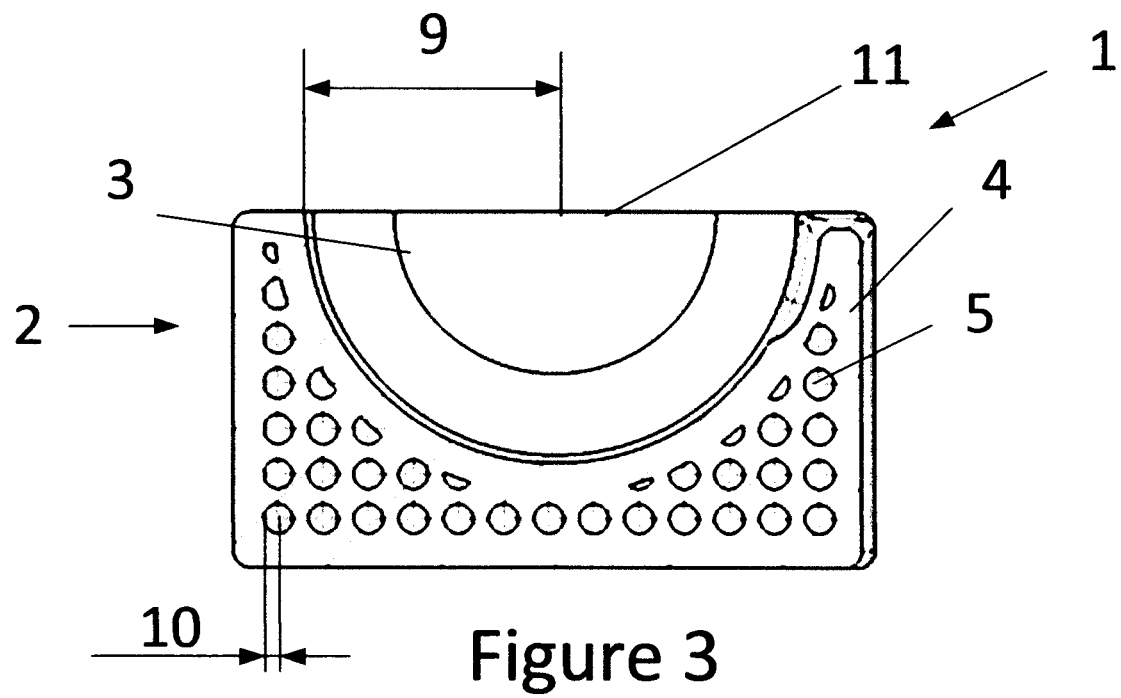
FIG. 3 discloses a sonar device with a half spherical piezo electric element.

As exemplified by FIG. 2 the body element is disclosed as having a circular cylinder shape. The cylinder shape is suitable for a sonar device as it is essentially uniform in a transversal plane as shown in FIG. 2. Even though the cylindrical shape is preferred, the shape of the sonar device can be spherical, or in other ways regular.

Figure 1:
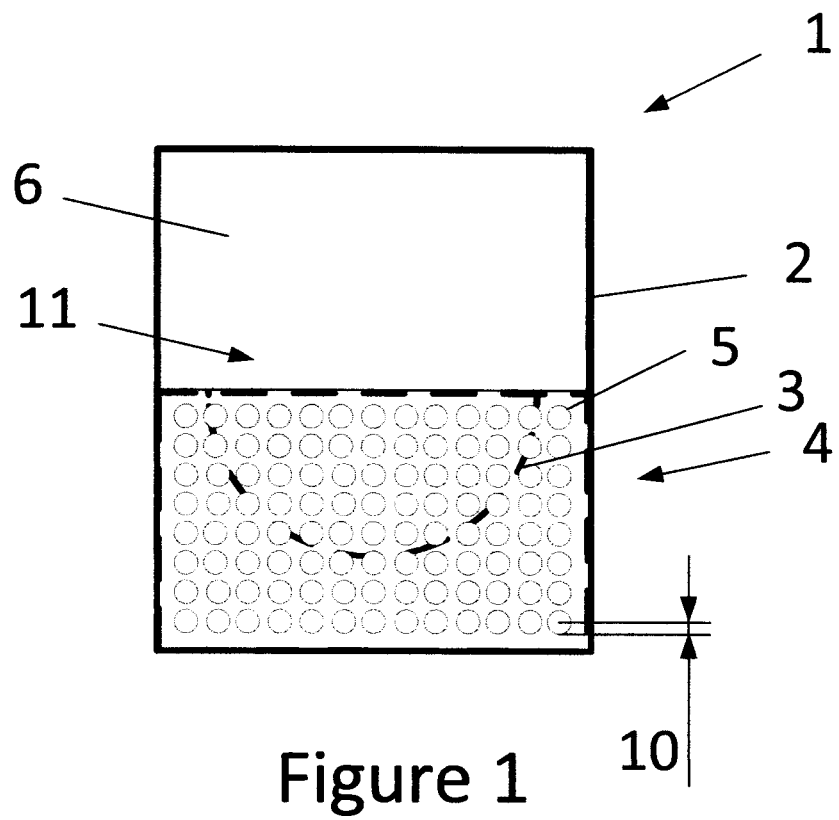
FIG. 1 discloses a sonar device according to the invention from the side, with a transparent body for better view.
Figure 4:
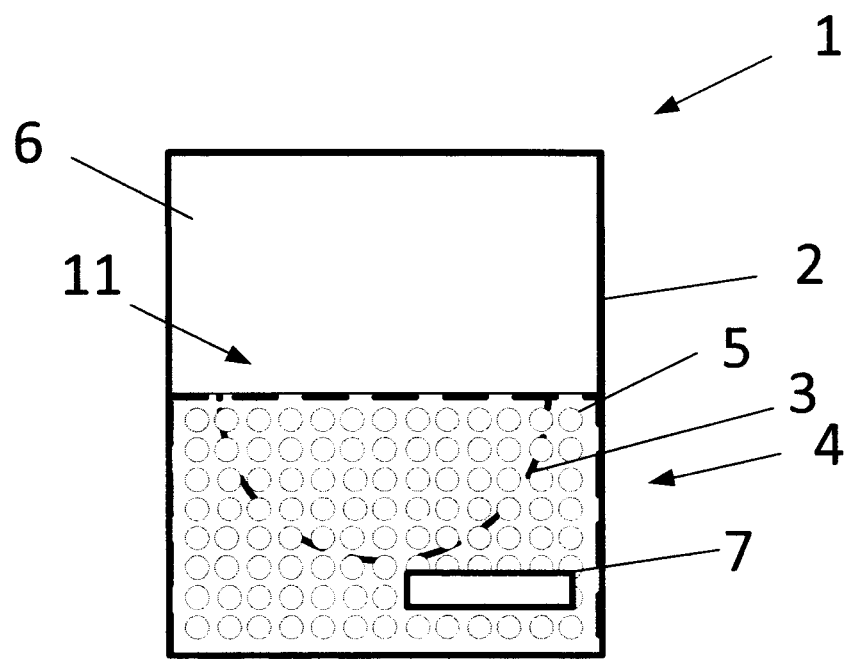
FIG. 4 discloses a sonar device with a cavity for electronics within the holder for the piezo electric element.

The sonar device 1 comprises a piezo electric element 3. The shape of the piezo electric element 3 is preferably half spherical, as shown in FIGS. 1-4. In FIGS. 1 and 4, the piezo electric element 3 is disclosed with a dashed line, as it is positioned inside the body element 2, and not visible in when the sonar device 1 is in operation. The piezo electric element 3 is preferably made of a ferroelectrics material for example barium titanate or lead zirconate titanate or a piezo ceramic material.

The piezo electric element 3 is held by a holder 4. The holder 4 is positioned concentric with the body element 2 in the lower part of the body element 2. The piezo electric element 3 is positioned in the holder 4. The body element 2 is provided with a resin fill.

The holder 4 is provided with a damping structure 5. This damping structure 5 is disclosed in FIG. 1 as round spherical cavities. The shape of the individual damping structure 5, need not be round or spherical, any suitable shape is thinkable.

Figure 5:
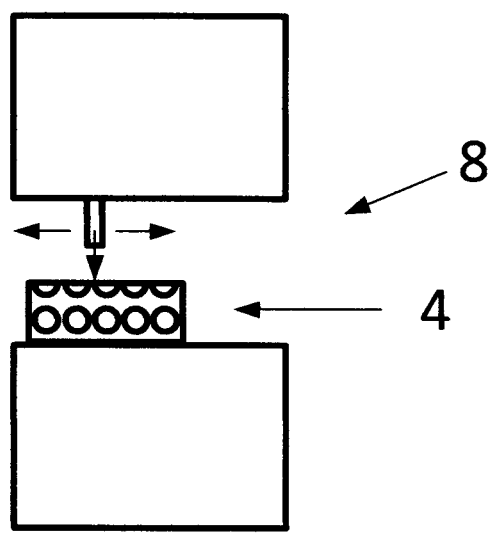
FIG. 5 discloses a reciprocating three dimensional printing device.

The damping structure 5 is provided as a unity with the holder 4. Thus cavities are formed within the material of the holder 4. The holder 4 is preferably manufactured in one piece. The damping structure 5 is preferably provided by manufacturing the holder by means of a reciprocating three dimensional printing device 8, see FIG. 5.

The individual damping structure 5 as made up from the cavities 5 has a volume that is comprised in the range of 1/1000-1/1000 000 of the volume of the piezo electric element 3.

The individual damping structure 5 can further be made up from spherical cavities preferably having a spherical radius 10 that is 1/10-1/100 of the spherical radius 9 of the piezo electric element 3.

The damping structure 5 is preferably made as a regularly distributed three dimensional pattern. As propagating sound waves under water comes with a much higher velocity than in air, a regular pattern will interfere much less, and in a predictable way to the propagating sounds waves which are to be detected. If a half sphere is used for the piezo electronic equipment damping is regularly distributed on the bowl shape of the half sphere. Listening is preferred to be done from the flat side 11 of the half sphere.

Preferably the sonar device as disclosed in FIGS. 1-4 has a filling of a resin 6.

The resin is preferably a temperature resistant and has the ability prevent water from entering the sonar device 1 and thereby prevent the piezo electric element 3 from being damaged.

The filling of the resin is provided after installation of the piezo electric element 3 and the holder 4. Thereby the piezo electric element 3 is kept in position during the filling, and after filling both the holder 4 and the resin fill can cooperate in order to hold the piezo electric element 3.

As disclosed in FIG. 4, by using a three dimensional printing device 8 for manufacture of the holder 4 it is possible to design the holder so as to incorporate within the holder the electronic equipment 7 that is needed for the operation of the sonar device 1'. Also the wiring of the electronic equipment can be incorporated directly into the structure of the holder 4. It is possible to completely contain the electronic equipment within the structure but also to leave an opening for easy access from outside if needed.

The electronics is arranged to receive signals from the piezoelectric element. The electronics is arranged to obtain a signal indicative of a detected object under water. Further the electronics may be arranged to obtain the sonar signal based on the received piezo electric signals and based on information related to the influence from the holder 4 on the provided piezo electric signal. In short the holder dampens the signal coming from the bottom or sides of FIGS. 1-4, and as no damping structure is provided from the above listening is mainly done in this direction.

Figure 6:
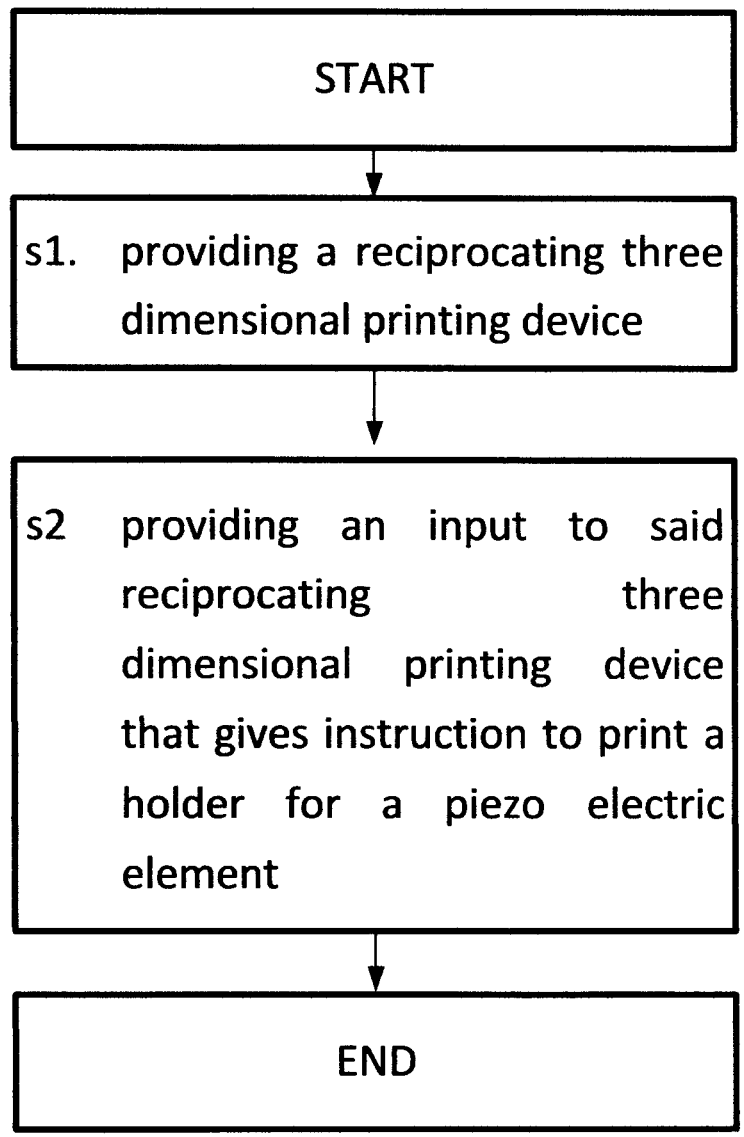
FIG. 6 discloses a method for manufacturing a holder for a sonar device.

The disclosure also relates to a manufacturing method of the holder 4 for the sonar device 1, 1' of FIGS. 1-4. The method used as for some steps of the manufacturing a three dimensional printing device 8. The manufacturing method as seen in FIG. 6, comprises the steps of:

s1. providing a reciprocating three dimensional printing device

In this step s1 a suitable reciprocating three dimensional printing device 8 is provided. The device can be any device however it must be suitable for providing a layer of for example resin that does not interfere with the piezo electric device 3.

s2. providing an input to said reciprocating three dimensional printing device that gives instruction to print a holder for a piezo electric element, wherein the input to the printer comprises instruction to print at least one cavity in the holder for damping purposes.

In this step s2 the design of the damping structure and the outer dimensions of the holder 4 are set. This must of course be adapted to the chosen piezo electric element, its dimensions and the material of it. The damping structure can be freely designed and it is convenient to design complex damping structures which are contained within the structure of the holder 4. The formed cavities 5 provide the important feature for achieving the damping effect needed for the sonar device. By the manufacturing method it is very convenient as discussed above to provide a damping structure in the form of cavities.

Figure 7:
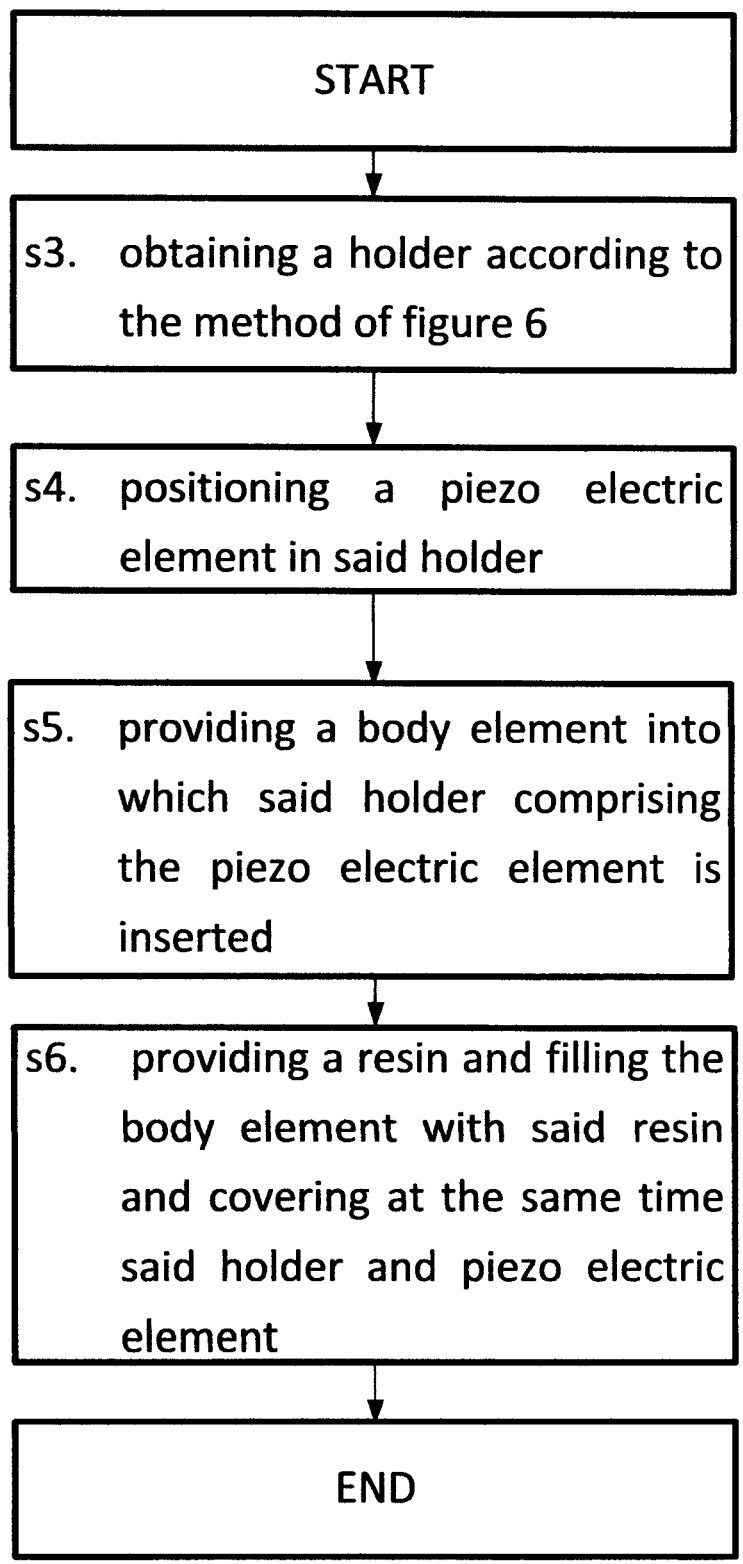
FIG. 7 discloses a method for manufacturing a sonar device.

Further there is disclosed a method as seen in FIG. 7, of manufacturing a sonar device according to the above, comprising the steps of:

s3. obtaining a holder according to the method above and s4 positioning a piezo electric element in said holder.

Step s3 of obtaining a holder provides for having a holder before steps s5 and s6. The piezo electric element needs to be positioned at a certain position and not move around as the sonar device is finished, thus it is an advantage to have the holder to hold the piezo electric element before going to step s5 and s6.

The method of manufacturing a sonar device further comprises a step of s5. providing a body element into which said holder comprising the piezo electric element is inserted, By inserting the piezo electric element before introducing the package of piezo electric element and the holder to the body element, the holder can also guide the insertion to the body element, and also protect the piezo electric element during the insertion.

The method of manufacturing a sonar device further comprises a step of s6. providing a resin and filling the body element with said resin and covering at the same time said holder and piezo electric element at the same time.

The resin filling 6 is important for preventing water to enter into contact with the piezo electric element. The resin filling 6 also additionally gives a stabilizing effect on the piezo electric element in cooperation with the holder 4, thus improving the stability of the complete sonar device 1.

Even if only listening is discussed above it should be understood that the sonar can also be active and send out sound waves that are then detected as an echo after, bouncing on objects.

The invention claimed is:

1. Sonar device (1) for detection of underwater objects, said sonar device comprising:

a body element (2) having a cavity, a piezo electric element (3) positioned within the cavity and having: (i) a half-spherical shape defining a curved surface of the piezo electric element (3), and (ii) a planar surface defined by a diameter of the piezo electric element (3), a holder (4) having a plurality of damping structures (5) and supporting and centering the piezo electric element (3) within the body element (2), the piezo electric element (3) being positioned in the holder (4) such that the piezo electric element (3) is positioned and spaced apart a distance above a base surface of the body element (2), such that a portion of the holder (4) is positioned below the piezo electric element (3) and intermediate the piezo electric element (3) and the base surface, and such that the curved surface of the piezo electric element (3) is encapsulated by the holder (4), and a resin filling (6) within the cavity in order to protect the piezo electric element (3) from water at underwater operation.

2. Sonar device (1) according to claim 1, wherein the planar surface is exposed relative to the holder (4) and the plurality of damping structures (5) thereof.

3. Sonar device (1) according to claim 1, wherein the damping structures (5) are cavities (5) within the material of the holder (4).

4. Sonar device (1) according to claim 3, wherein the cavities comprise spherical cavities (5).

5. Sonar device (1) according to claim 4, wherein spherical radius (10) of the cavities is comprised in a range of $1/10$ - $1/100$ of the spherical radius (9) of the piezo electric element (3).

6. Sonar device (1) according to claim 3, wherein each cavity (5) has a volume that is comprised in the range of $1/1000$ - $1/1,000,000$ of the volume of the piezo electric element (3).

7. Sonar device (1) according to claim 3, wherein the cavities are positioned in a regular pattern in the structure of the holder (4) such that the cavities (5) can provide equal damping from all relevant damping directions.

8. Sonar device (1) according to claim 1, wherein further the holder (4) comprises a further cavity suitable to accommodate electronics (7) for the sonar device (1') directly within the structure of the holder (4).

9. Sonar device (1) according to claim 1, wherein the holder (4) for the piezoelectric element is made by a reciprocating three-dimensional printing device (8).

10. Sonar device (1) according to claim 1, wherein the holder (4) for the piezoelectric element is made of a resin material, for example urethane, nylon or other resin.

11. Method for manufacturing a holder (4) for a sonar device (1) according to claim 1, said method comprising the steps of:

providing a reciprocating three-dimensional printing device; and providing an input to said reciprocating three-dimensional printing device that gives instruction to print a holder for a piezo electric element, wherein the input to the printer comprises an instruction to print at least one cavity in the holder for damping purposes.

12. Method according to claim 11, further comprising the steps of:

obtaining the holder, positioning a piezo electric element in said holder, providing a body element into which said holder comprising the piezo electric element is inserted, and providing a resin and filling the body element with said resin and covering at the same time said holder and piezo electric element at the same time.

13. Sonar device (1) according to claim 1, wherein the distance is such that the piezo electric element (3) does not directly contact the base surface of the body element (2).

14. Sonar device (1) according to claim 13, wherein the distance is such that the piezo electric element (3) does not directly contact any surfaces of the body element (2).

* * * * *